United States Patent [19]

Jackson

[11] Patent Number: 4,510,751

[45] Date of Patent: Apr. 16, 1985

[54] OUTLET METERING LOAD-SENSING CIRCUIT

[75] Inventor: Alan D. Jackson, Hutchinson, Kans.

[73] Assignee: The Cessna Aircraft Company, Wichita, Kans.

[21] Appl. No.: 370,887

[22] Filed: Apr. 22, 1982

[51] Int. Cl.3 .......... F16H 39/46

[52] U.S. Cl. .......... 60/450; 60/452

[58] Field of Search .......... 60/450, 452, 445, 487

[56] References Cited

U.S. PATENT DOCUMENTS

| | | | |
|---|---|---|---|
| 3,333,415 | 8/1967 | Adams | 60/450 |
| 3,935,706 | 2/1976 | Stevens | 60/450 |
| 3,996,744 | 12/1976 | Ridge | 60/450 |
| 4,037,410 | 7/1977 | Jackson et al. | 60/450 |
| 4,079,805 | 3/1978 | Rau | 60/450 |
| 4,089,169 | 5/1978 | Miller | 60/450 |

FOREIGN PATENT DOCUMENTS

| | | | |
|---|---|---|---|
| 2322192 | 11/1974 | Fed. Rep. of Germany | 60/445 |
| 46277 | 4/1977 | Japan | 60/450 |

*Primary Examiner*—Charles T. Jordan

*Assistant Examiner*—Richard Klein

*Attorney, Agent, or Firm*—Edward L. Brown, Jr.

[57] ABSTRACT

A meter-out load sensing hydraulic system controlling one or more motors, supplied by a variable displacement pump through a directional control valve. The compensating means of the pump senses pressure and flow on the discharge or return side of the motor to determine the pump cam plate position. The signal line connecting this discharge side of the motor to the compensating means is also supplied with a low pressure signal flow which causes the pump to standby at a low pressure level in a neutral valve position or when metering down a gravity load.

5 Claims, 4 Drawing Figures

OUTLET METERING LOAD-SENSING CIRCUIT

BACKGROUND OF THE INVENTION

Some modern hydraulic systems which are supplied by variable displacement pumps are of the type referred to as "load responsive". A load responsive system permits the variable displacement pump to pump only that flow and pressure necessary to move a particular load and is typified in U.S. Pat. No. 3,401,521. The speed which the load is moved can be controlled by the spool position of the directional control valve in the system which senses a pressure drop across the valve spool and accordingly adjusts the pump output as typified in U.S. Pat. No. 4,037,410.

The above-mentioned prior art "load responsive" systems sense the pressure drop across the incoming flow from the pump to the motor.

The present invention senses the pressure drop on the outlet side of the load, which is also the return flow from the motor, rather than the inlet side as done in the lastmentioned patent. It is advantageous to meter on the outlet side of a load in various situations such as craning of a heavy gravity load. Outlet metering also provides inherent cavitation control up to the flow capacity of the pump. Outlet metering also allows an added system stiffness, by maintaining a slight pressure on the low pressure side of any gravity load as it is being lowered or stopped. The logic required for a meter-out system is different than the conventional meter-in type system of the prior art material above. However, the meter-out system can be used with the same pressure and flow compensators descried in the meter-in system of U.S. Pat. No. 3,508,847.

SUMMARY OF THE INVENTION

The logic of the "meter-out" system of the present invention causes the pump to increase its flow output whenever the signal line pressure drops below a certain predetermined limit, such as 200 PSI. If the signal pressure exceeds this limit, the pump will reduce its flow output until the 200 PSI level is reached.

The signal line senses the pressure in a signal cavity in the directional control valve which is located between the return work port of the motor and a drain or reservoir cavity. If there is not sufficient pressure in the signal cavity, the pump compensation means will increase the pump flow until there is. In a situation of lowering a heavy gravity load, there will obviously be sufficient pressure in the signal cavity, since the weight of the load will be felt as the control valve spool meters this return flow to reservoir. In such a condition, a check valve in the sensing line will prevent the load pressure from back-flowing to the pump compensator and the pump will standby at its predetermined low pressure limit of 200 PSI since the pump discharge pressure is also exposed to the compensator.

It is therefore the principal object of the present invention to provide a load sensing hydraulic system which senses the return flow from the motor to control the amount of flow from the pressure source.

Another object of the present invention is to provide an "outlet metering" system which generates a standby signal from a separate pressure source from the main pump of the system.

A further object of the present invention is to provide a load responsive system with a much simplified directional control valve design, including the added functions of regeneration and float.

Another object of the present invention is to provide a load responsive valve in a pressure and flow compensated system with a simplified signal circuit.

Another object of the invention is to provide a control valve in a load responsive system which will positively hold a load without any back flow through the circuit prior to lifting.

Other objects and advantages of the present invention will become apparent to those skilled in the art from the following detailed description which proceeds with reference to the accompanying drawings wherein.

DESCRIPTION OF THE PREFERRED EMBODIMENTS

Figure 1:
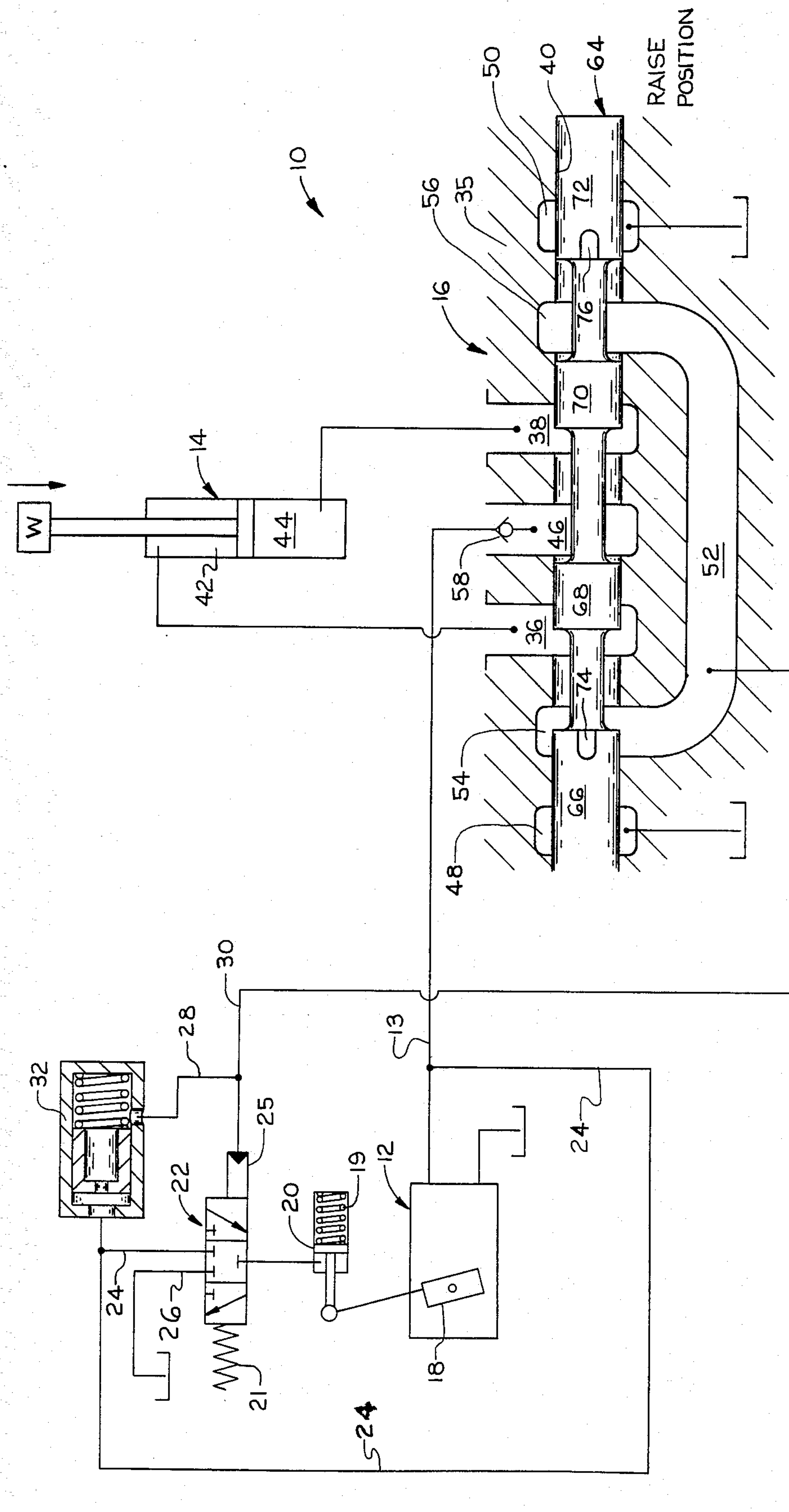
FIG. 1 is a longitudinal cross section through the directional control valve in the raise position with the remaining components of the system schematically shown.

With reference to FIG. 1 of the drawings, the load responsive hydraulic system in the present invention is generally described by reference numeral 10. The system includes a variable displacement pump 12 which supplies a double-acting motor or cylinder 14 through a four-way directional control valve 16. The control valve 16 can either be a single valve as illustrated, or a stack-type valve, well known in the trade. In a stack arrangement, a plurality of sections are sandwiched together in a stack with each valve using common pump pressure passages, common drain passages, and parallel connected signal passages.

The primary pump unit 12 is of an axial piston type, also well known in the art, having a tiltable cam plate 18 which is positioned by control cylinder 20 biased by spring 19 towards a maximum flow position. The cam plate position of pump 12 is controlled by small servo-actuated spool valve 22 which controls the flow to or from control cylinder 20. Valve 22 is similar to the flow compensating spool 35 described in U.S. Pat. No. 3,508,847. Valve 22 is also referred to hereafter as the pump compensating means in conjunction with control cylinder 20. While the drawings do not illustrate a high pressure limiting spool valve as part of the pump compensator, one could be used, such as spool 48 shown in U.S. Pat. No. 3,508,847. Spool valve 22 is urged by spring 21 towards an increased flow position which drains the pressure from control cylinder 20 through line 26 due to the force of spring 19. Opposing the spring 21 on valve 22 is a servo cylinder 25 sensing pressure in signal line 30, and when pressurized urges the spool valve 22 to a second position allowing pump pressure from line 24 to enter cylinder 20 and reduce the displacement of pump 12. Also connected to servo 25 is a pump pressure line 28 which provides a small 1 GPM pilot flow from pump 12 across flow limiter 32. When the flow across limiter 32 reaches 1 GPM, the variable orifice within the limiter prevents any further increase in flow regardless of pressure. Located in signal line 30 between the directional control valve 16 and the pressure line 28, is check valve 34 which prevents pressure from back-flowing from the control valve 16 to the servo 25, but allowing the 1 GPM pilot flow from line 28 to flow in the reverse direction into signal cavity 52.

Directional control valve 16 controls the flow of fluid from the pump 12 to the double-acting motor 14 which in turn moves a load W. Control valve 16 comprises valve body 35 having a bore 40 therein which contains a valve spool 64. Intersecting bore 40 are a pair of work ports 36 and 38 which are in turn connected to opposite rod and head chambers 42 and 44 of double-acting cylinder 14, respectively. Also intersecting bore 40 between work ports 36 and 38 is a pump pressure cavity 46 connected to pump discharge line 13. Positioned outside of the work port cavities 36 and 38 are a pair of return cavities 48 and 50. Located in valve body 35 is a signal loop cavity 52 having two branches 54 and 56 which intercept the spool bore 40 between the corresponding return ports and motor ports respectively. Positioned in pump discharge line 13 is a conventional load check 58 which prevents the load from back-flowing whenever the load exceeds the pump discharge pressure.

Figure 3:
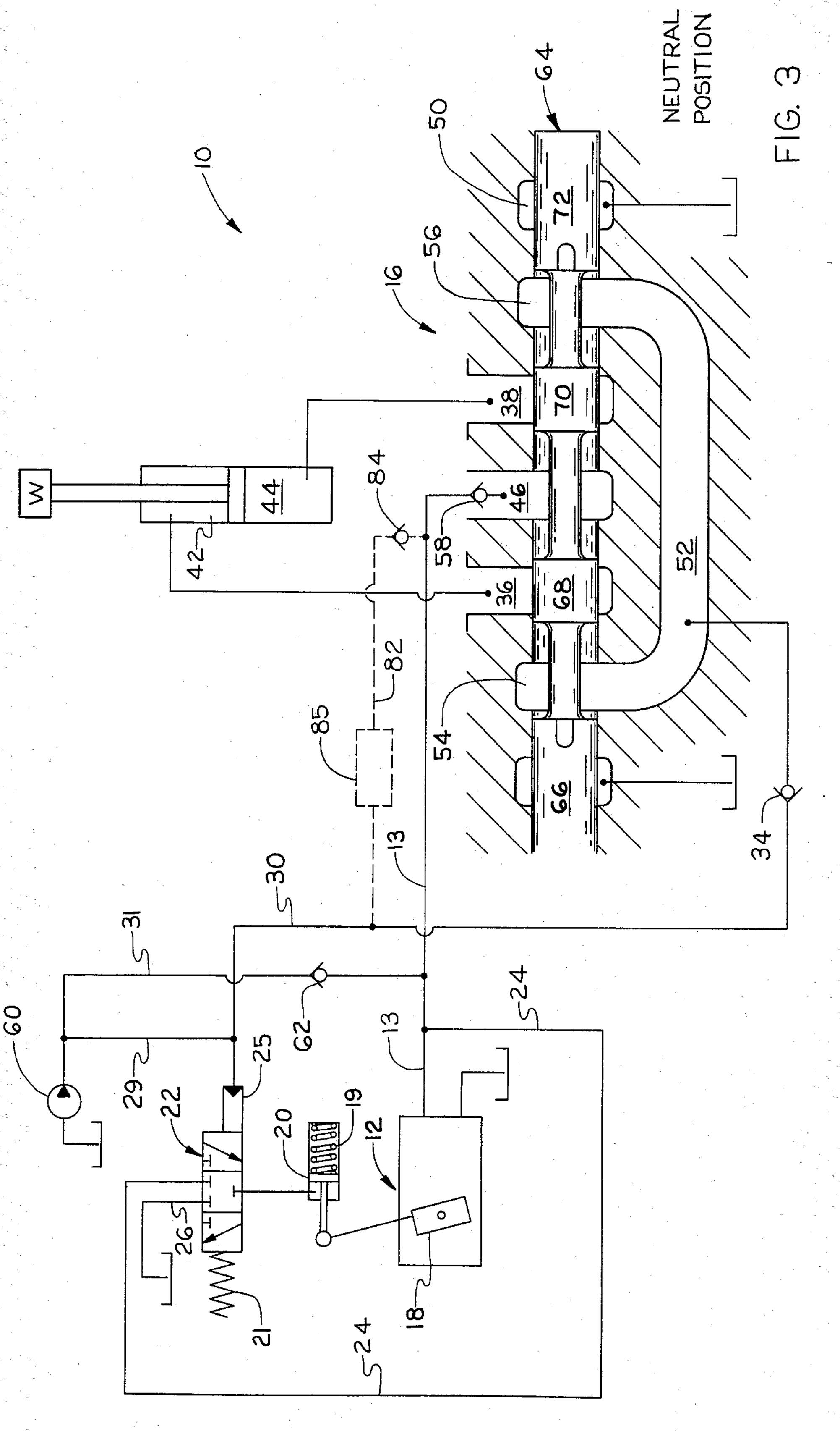
FIG. 3 is a similar longitudinal cross section of the control valve in the neutral position with a modified pressure source illustrated in the signal circuit.

FIG. 3 discloses an alternate method of providing a pressure source to servo 25 with a small fixed-flow gear pump 60 which connects to servo 25 through pressure line 29. The discharge from pump 60 is also connected to the main discharge line 13 of the main pump 12 through line 31 and across check valve 62. Pump 60 has a low flow rate and on the order of 1.0 GPM and will provide a pressure in signal line 30 which will be no higher than 200 PSI standby pressure.

Figure 2:
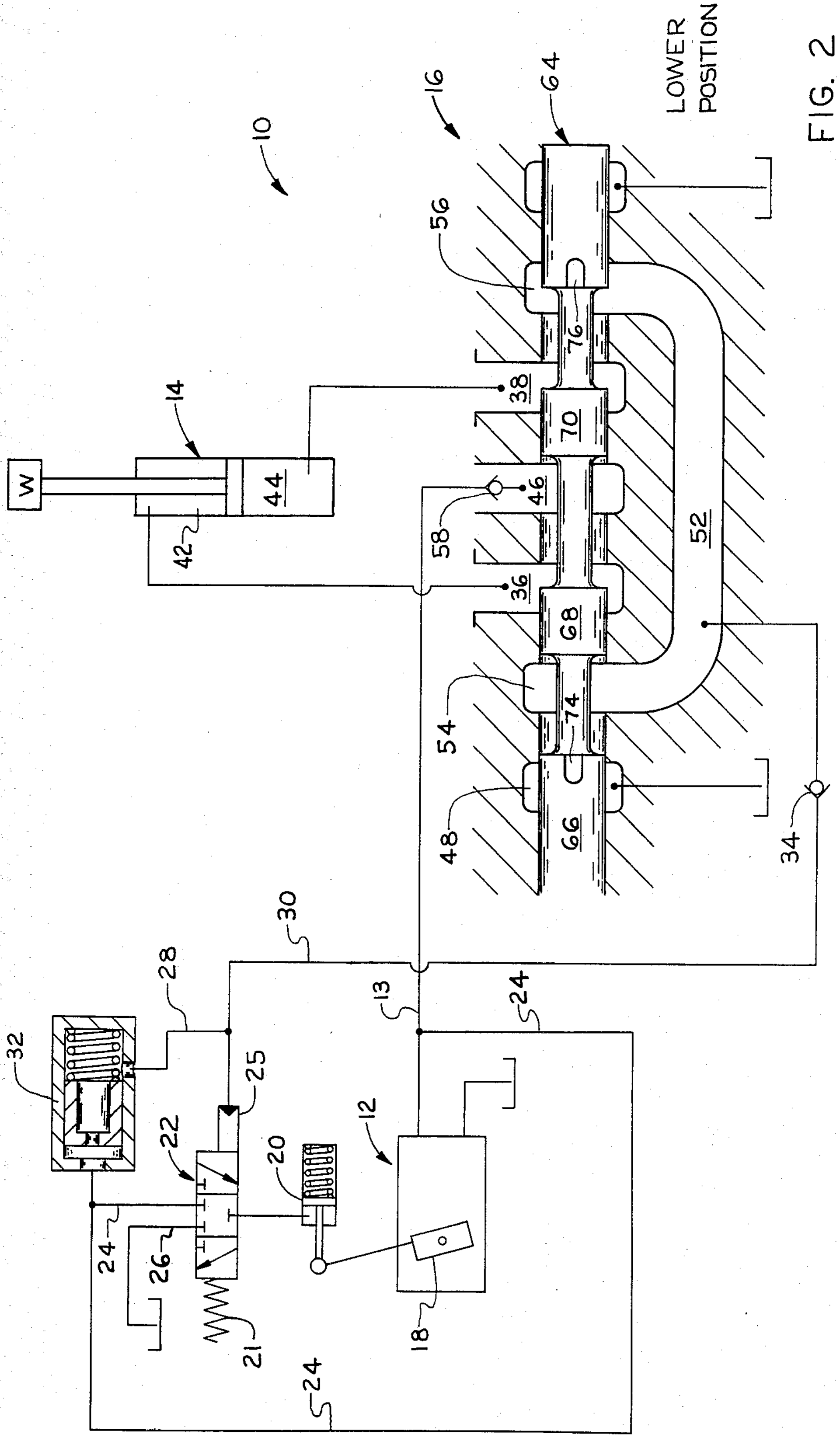
FIG. 2 illustrates a similar longitudinal cross section of the control valve in the lower position.

With valve 16 in the neutral position, as illustrated, gear pump 60 would generate approximately 200 PSI. This would cause the compensating valve 22 to destroke the cam plate 18 to a negative cam position, allowing the signal flow to pass through check valve 62 and flow through the main pump 12 backwards to reservoir. One advantage of a gear pump generated signal is that an existing low flow and pressure lubricating system pump could be used with negligible added cost. The principal advantage of this type of signal generation is horsepower efficiency. In the main pump generated signal flow system of FIGS. 1 and 2; it requires 2 H.P. to generate 1 GPM at maximum pump pressure level of 3500 PSI. The gear pump 60 only generates 200 PSI initially with a 2 H.P. saving.

In applications such as large machines, the individual valves can be mounted a substantial distance from each other. This remote positioning creates increased line losses and requires higher signal pressures.

Figure 4:
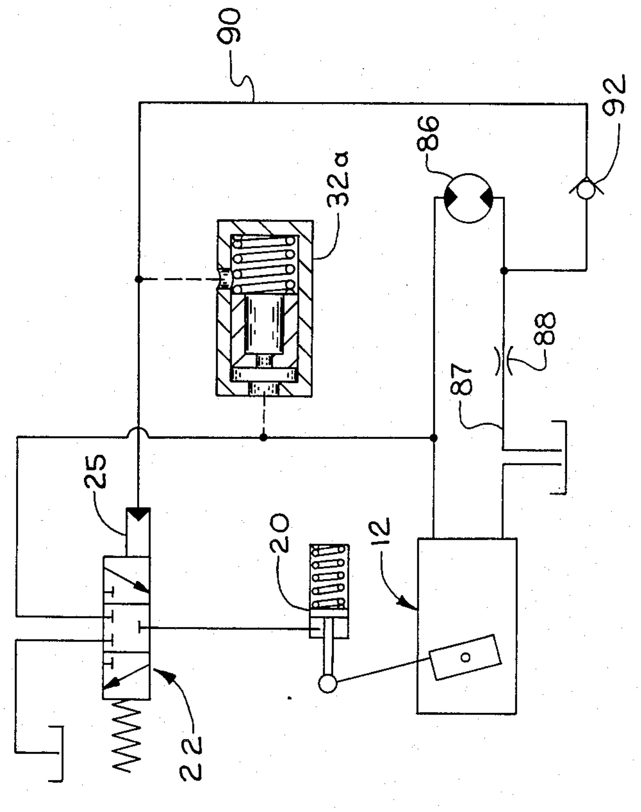
FIG. 4 is a modified form of the meter-out system of the present invention.

FIG. 4 illustrates a modified form of the present invention without the directional control valve. An application of this type would be a fan or generator drive where constant motor speed was required with a variable prime mover. The variable displacement pump 12, control cylinder 20, and compensating valve 22 are similar in function to FIG. 1. Pump 12 drives a motor 86 with the return flow to reservoir passing through discharge line 87 and restriction 88. Sensing line 90 connects the motor discharge flow in line 87 to the servo 25 so that valve 22 will adjust the flow rate of pump 12 so as to maintain a constant pressure upstream of restriction 88. If motor 86 was an application which might attempt to over run the pump, the check valve 92 in sensing line 90 would prevent a false signal and flow limiter 32*a* would provide standby pressure at the inlet of motor 86.

Another method of generating a signal flow which is not shown in the drawing would be to replace flow limiter 32 of FIG. 1 with a fixed orifice sized to cause a 1 GPM flow at, for example, 3500 PSI.

OPERATION

With the valve spool 64 neutrally positioned as illustrated in FIG. 3, all cavities of valve 16 are isolated from each other so that there is no flow across the valve. Since there is no flow out of signal loop cavity 52, the pressure in signal line 30 will be identical to that in the main pump discharge line 13 due to the presence of check 62 in line 31. The pump discharge pressure in line 13 is felt against servo 25 thereby causing valve 22 to stroke back cam plate 18 to its standby pressure, for example 200 PSI, which is determined by the force of spring 21. The system will then standby with a 200 PSI pressure in pump pressure cavity 46 of valve 16.

As valve spool 64 is shifted rightwardly towards its raised position, as seen in FIG. 1, the following sequence takes place. Rightward movement of valve spool land 70 opens pump pressure cavity 46 to work port 38. However, there is no flow thereacross, presuming the load W on cylinder 14 exceeds the standby pressure of 200 PSI. There is also no back flow from the load chamber 44 due to load check 58. Valve spool land 68 shifting rightwardly also opens the opposite motor port 36 into branch 54 of the signal cavity 52. The pressure in cavity 52 is open to drain across notch 76 into return cavity 50. The 200 PSI pressure in signal cavity 52 now drops to zero which is also felt on servo 25. This pressure drop at servo 25 causes valve 22 to shift righwardly due to the effect of spring 21 thereby causing the pressure to be drained from control cylinder 20 due to the action of spring 19. This extension of cylinder 20 increases the stroke and the displacement of pump 12 causing the pressure to build in pump discharge line 13 until that pressure matches the load pressure in chamber 44 and the motor begins to move. As the cylinder 14 begins to move, the cylinder discharge flow from chamber 42 enters the signal cavity 52 of the valve and combines with the small signal flow in line 30 and flows across notch 76 to return. The pump 12 will increase its flow rate until the cylinder discharge flow and the signal line flow are sufficient to cause a 200 PSI pressure build-up at the outlet meter or notch 76 in control valve 16. Once this 200 PSI pressure is reached in signal cavity 52, the pump 18 will stabilize its flow or decrease its flow if the pressure in signal cavity 52 exceeds 200 PSI.

In the FIG. 1 circuit, as the pressure builds in pump discharge line 13 to a certain level, the flow limiter 32 restricts the flow in line 28 to a predetermined maximum level of, for example, 1 GPM so that the pressure in signal cavity 52 is felt in servo 25 even though check valve 34 will prevent any back flow in signal line 30.

In the initial raise condition (FIG. 1) previously discussed, it was presumed the load W on cylinder 14 was in a downward direction exerting pressure on chamber 44. However, assuming the load W moves over a dead center position and shifts in the opposite direction, the pressure in the chamber 42 on the rod side of cylinder 14 will increase to whatever the load pressure might be. This reversing of the load increases the pressure in signal cavity 52 causing check valve 34 to seat, preventing back flow in the signal line 30 and also blocking the signal flow in pressure line 28. With the signal flow now blocked, servo 25 will directly sense the pump discharge pressure in line 13 and the pump will adjust its stroke so as to maintain a standby pressure in the pump discharge line 13 of, for example, 200 PSI. As the load W continues to pull the motor 14 in an upward direction, the notch 76 in spool 64 governs the speed of motor travel which pump 12 will vary its flow rate in attempting to maintain a 200 PSI pressure in the pump discharge line 13 as the head chamber 44 fills.

When the valve spool 64 of the control valve is shifted from a power position into a neutral position, the signal loop cavity 52 is again isolated, which in effect blocks any pilot flow in signal lines 28 and 30, thereby causing the pump 12 to shift to a 200 PSI standby discharge pressure. In a lowering mode, as illustrated in the FIG. 2, valve spool 64 is shifted leftwardly from its neutral position to that position shown in FIG. 2 which opens pump pressure cavity 46 to motor port 36 while opening motor port 38 to the right branch 56 of signal cavity 52. The load pressure from motor 14 now experienced in signal cavity 52 is prevented from back-flowing to servo 25 by a check valve 34. Located in the valve spool land 66 is a metering notch 74 which meters the left branch 54 of signal cavity 52 to reservoir through drain return cavity 48. Since there is no flow in the signal line 30 due to the pressure on check 34, the pump 12 will position its cam plate 18 so as to maintain a 200 PSI standby pressure in pump discharge line 13. This standby condition is effected because pump discharge pressure is directly felt on compensator servo 25 through line 24, flow limiter 32 and line 28. If the pump discharge pressure in line 13 is less than 200 PSI, spring 21 will shift spool valve 22 in a rightward direction opening control cylinder 20 to drain line 26. The compression spring in control cylinder 20 shifts its piston leftwardly, increasing the stroke of cam plate 18 until the pressure experienced in line 28 reaches its standby level.

As long as the load W on motor 14 exceeds 200 PSI, there will be no flow in signal line 30 and the pump 12 will hold a 200 PSI pressure on rod chamber 42 of the cylinder as the load is lowered.

Having described the invention with sufficient clarity to enable those familiar with the art to construct and use it, I claim:

1. A load sensing meter-out hydraulic system controlling a motor, supplied by the output of a variable displacement pump through a directional control valve, the system including:

a pilot flow pressure source comprising a line connected to the output of the variable displacement pump with a flow restriction means in the line;

a flow control cylinder attached to the pump for varying the flow output of the pump;

a servo actuated pump compensating means connected to the output of the variable displacement pump and a drain for controlling the flow to and from the control cylinder;

a directional control valve having a bore which is intersected by a pump pressure cavity supplied by the variable displacement pump, first and second motor port cavities, a return cavity and a signal cavity between each of the motor port cavities and the return cavity;

a signal line connecting the servo of the pump compensating means to the signal cavity of the valve including a check valve blocking flow from the signal cavity to the servo;

a supply line from said pilot flow pressure source supplying the signal line between the check valve and said servo whereby the pressure in the signal cavity of the valve is sensed at the servo of the pressure compensating means, so that the pump discharge can be varied through the compensating cylinder to maintain a constant pressure in the signal cavity of the valve; and a spool means in the directional control valve having a first position opening pump pressure to a first motor port while opening the second motor port to the signal cavity and metering the signal cavity to drain.

2. A load sensing meter-out hydraulic system as set forth in claim 1 wherein the flow restriction means is a flow limiter which prevents the flow in the signal line from exceeding a certain minimal amount.

3. A load sensing meter-out hydraulic system as set forth in claim 1 including a biasing means urging the flow control cylinder toward a position of maximum pump flow and the pump compensating means comprises a three-position, three-way spool valve with a pressure responsive servo cylinder acting on one end of the spool urging it in one direction and spring means urging the spool in the opposite direction.

4. A load sensing motor-out hydraulic system as set forth in claim 1, wherein the directional control valve is a four-way valve including; a pair of return cavities and the signal cavity is u-shaped with two legs, each leg intersecting the bore between a motor port cavity and a return cavity.

5. A load sensing meter-out hydraulic system controlling a motor, supplied by a variable displacement pump through a directional control valve, the system including:

a pilot flow pressure source comprising a low volume fixed flow pump including a parallel line connecting the fixed flow pump to the discharge of the variable displacement pump and a first check valve in the parallel line preventing back flow to the fixed pump;

a flow control cylinder attached to the variable displacment pump for varying the output of the pump;

a servo actuated pump compensating means connected to the discharge of the variable displacement pump and to drain for controlling the flow to and from the control cylinder;

a directional control valve having a bore which is intersected by a pump pressure cavity supplied by the variable displacement pump, first and second motor port cavities, a return cavity and a signal cavity between each of the motor port cavities and the return cavity;

a signal line connecting the servo of the pump compensating means to the signal cavity of the valve including a check valve blocking flow from the signal cavity to the servo;

a supply line from said pilot flow pressure source supplying the signal line between the check valve and said servo whereby the pressure in the signal cavity of the valve is sensed at the servo of the pressure compensating means, so that the pump discharge can be varied through the compensating cylinder to maintain a constant pressure in the signal cavity of the valve; and a spool means in the directional control valve having a first position opening pump pressure to a first motor port while opening the second motor port to the signal cavity and metering the signal cavity to drain.

* * * * *